United States Patent [19]

Schäfer

[11] Patent Number: 5,031,841

[45] Date of Patent: Jul. 16, 1991

[54] METERING VALVE, PARTICULARLY FUEL INJECTION VALVE

[75] Inventor: Hans-Jürgen Schäfer, Braunschweig, Fed. Rep. of Germany

[73] Assignee: Volkswagen AG, Wolfsburg, Fed. Rep. of Germany

[21] Appl. No.: 480,055

[22] Filed: Feb. 14, 1990

[30] Foreign Application Priority Data

Feb. 28, 1989 [DE] Fed. Rep. of Germany ....... 3906184

[51] Int. Cl.[5] ........................ F16K 7/12; F16K 31/02; F02M 51/06

[52] U.S. Cl. ............................... 239/585; 251/129.06; 251/335.2

[58] Field of Search ............................ 239/585, 102.2; 251/129.06, 129.17, 335.2

[56] References Cited

U.S. PATENT DOCUMENTS

| | | | |
|---|---|---|---|
| 3,776,263 | 12/1973 | Hubenthal | 251/335.2 |
| 4,669,660 | 6/1987 | Weber et al. | 239/584 |
| 4,695,034 | 9/1989 | Shimizu et al. | 251/129.06 |
| 4,725,002 | 2/1988 | Trachte | 239/102.2 |

FOREIGN PATENT DOCUMENTS

| | | |
|---|---|---|
| 121028 | 10/1984 | European Pat. Off. . |
| 299532 | 11/1928 | United Kingdom . |
| 2193386 | 2/1988 | United Kingdom . |

*Primary Examiner*—Andres Kashnikow
*Assistant Examiner*—Karen B. Merritt
*Attorney, Agent, or Firm*—Spencer & Frank

[57] ABSTRACT

A fluid metering valve includes a housing; a nozzle opening; a spring diaphragm supported in the housing and hermetically dividing the inner space of the housing into a first chamber and a second chamber; an inlet provided in the housing for introducing pressurized fluid solely into the second chamber; and a valve needle slidably accommodated in the second chamber and having a closed position in which the valve needle maintains the nozzle opening closed and an open position in which the valve needle maintains the nozzle opening open. The valve needle is connected to the spring diaphragm and is resiliently urged by the spring diaphragm into the closed position. The metering valve further has a valve actuating member disposed in the first chamber and having an energized state and a deenergized state. The valve actuating member is connected to the valve needle for moving the valve needle into the open position against a force of the spring diaphragm when the valve actuating member is energized.

6 Claims, 1 Drawing Sheet

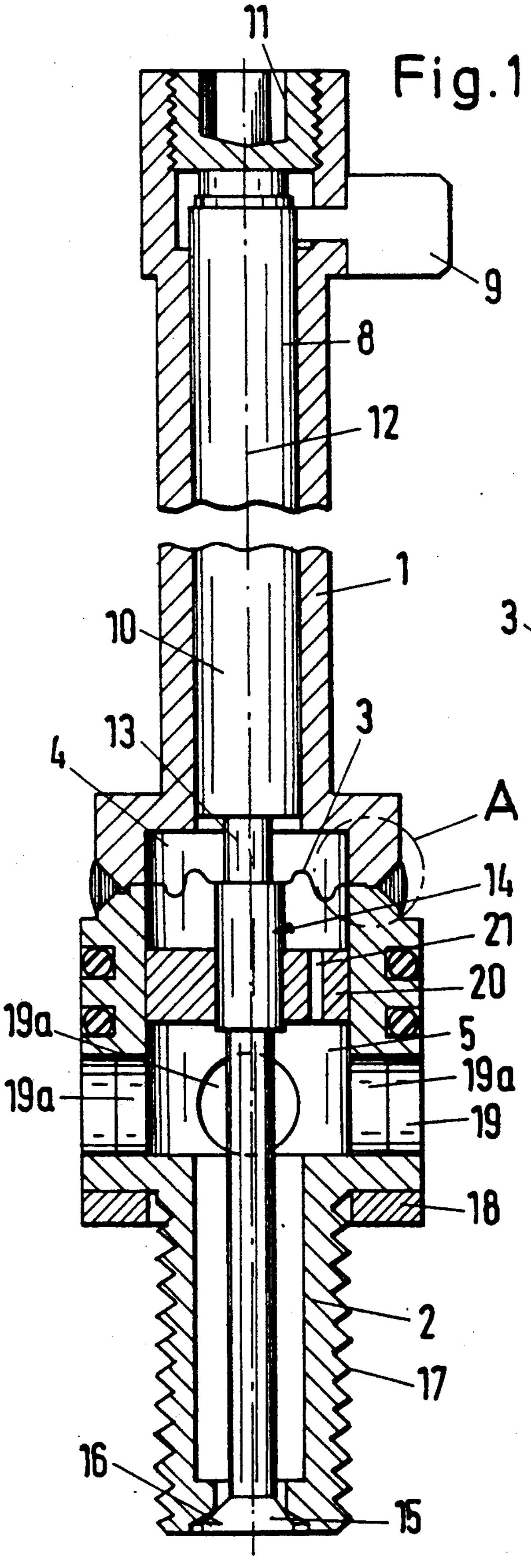
Fig.1
Fig.2
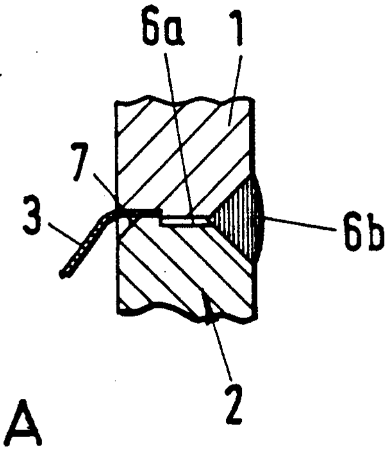

METERING VALVE, PARTICULARLY FUEL INJECTION VALVE

CROSS REFERENCE TO RELATED APPLICATION

This application claims the priority of Federal Republic of Germany Application No. P 39 06 184.1, filed Feb. 28th, 1989, which is incorporated herein by reference.

BACKGROUND OF THE INVENTION

This invention relates to a metering valve, particularly a fuel injection valve for an internal combustion engine and is of the type which has a valve needle slidably supported in a valve housing and arranged to open or close at least one metering aperture (nozzle opening) communicating with a supply line in which the pressurized medium to be metered is advanced. The valve needle is actuated to move into its open position by an actuating member formed of a component which, under the effect of a field varies its dimension at least in one direction. The valve needle is returned into its closed position by spring force.

The above-outlined metering valve, apart from its use to inject fuel in a pulsating manner, may be used to meter other fluids such as liquids or gases including vapors.

In the direct injection of diesel fuel or gasoline into the work chambers of internal combustion engines, particularly those used for driving automotive vehicles - which is the preferred mode of application of the invention - the high-pressure injection has distinct advantages as compared to the conventional low-pressure injection into an intake (suction) pipe. These advantages manifest themselves particularly in the avoidance of hot-starting problems. In high-pressure injection the fuel is continuously available at correspondingly high pressure and the valve needle for opening the metering aperture (injection nozzle) is operated by introducing external energy. To achieve sharp actuating pulses of defined duration, piezoelectric devices or actuating assemblies operating according to the principle of magnetostriction have been used. These assemblies thus involve actuating members which vary their dimensions under the effect of an electric or magnetic field.

Thus, European Patent 218,895 describes a metering valve of the above-outlined type, used as a fuel injection valve, which in an axial sequence has a piezoelectric stack actuator, a guided force-transmitting pin and a valve needle. The valve needle terminates in a valve head which externally extends over the metering aperture (injection nozzle opening) for closing the same. The piezoelectric stack actuator is disposed in a housing chamber which is connected with a fuel supply and which constitutes a storage chamber for the fuel. For returning the valve needle into the closed position from the position in which it maintains the injection nozzle open, a coil spring is used which surrounds the valve needle and is compressed between a flange forming part of the valve needle and a countersupport forming part of the valve housing.

The accommodation of the actuating member in a fuel-filled chamber involves problems particularly in case the fuel contains water since, for example, in a piezoelectric actuating member voltages in the order of magnitude of 150 volts and higher may be present.

SUMMARY OF THE INVENTION

It is an object of the invention to provide an improved metering valve of the above-discussed type which, practically without rendering the structure more complex, eliminates problems which may be caused by arranging the valve needle actuating member in the medium to be metered.

This object and others to become apparent as the specification progresses, are accomplished by the invention, according to which, briefly stated, the spring force which returns the valve needle into its nozzle-closing position is generated by a spring diaphragm which, in the valve housing, hermetically separates a first chamber containing the actuating element from a second chamber containing the medium to be metered.

Thus, the invention is not limited to the teaching to arrange the actuating member in a chamber which is hermetically separated from the medium (for example, fuel) to be metered, but also provides that the septum required for such a hermetic separation assumes, as a spring diaphragm, the further function of a valve needle return spring which conventionally has been a separately provided spring member. Thus, according to the invention, the additional return spring may be dispensed with.

In view of the motion characteristics required of the spring diaphragm, the latter should have a relatively robust structure while taking into account that the movement of the valve needle into the closed position must be very rapid. A strong spring diaphragm may be utilized particularly when a piezoelectric actuating member is used because the latter may be readily so designed that it generates relatively large forces for effecting the opening motions of the valve needle.

According to a further feature of the invention, that surface of the spring diaphragm which is oriented towards the second chamber is exposed to the pressure of the medium to be metered. This arrangement permits to provide a spring diaphram that generates a relatively small spring force, since one part of the return force is supplied by the medium pressure.

BRIEF DESCRIPTION OF THE DRAWING

FIG. 1 is an axial sectional view of a preferred embodiment of the invention.

FIG. 2 is an enlarged view of inset A of FIG. 1.

DESCRIPTION OF THE PREFERRED EMBODIMENT

Turning to FIG. 1, between two housing portions 1 and 2 of a fuel injection valve there is clamped a circularly corrugated spring diaphragm 3 which hermetically separates a first chamber 4 from a fuel-filled second chamber 5. As particularly well seen in FIG. 2 a clearance 6*a* formed between the facing edge portions of the housing parts 1 and 2 is closed in its radially outer zone by a circumferentially extending weld 6*b* and further, the housing portion 2 has, in a radially inner zone, a circumferentially extending rib 7 which presses the outer circumferential edge of the spring diaphragm 3 against the facing edge zone of the housing part 1.

In the chamber 4 which is hermetically separated from the fuel by the spring diaphragm 3, there are disposed a piezoelectric stack actuator 8 of conventional construction and thus not described in further detail, electrical terminals 9 connected to the stack actuator 8 and an intermediate component 10 made of a material which ensures compensation of the heat-caused length variations of the stack actuator 8. The stack actuator 8 and the intermediate component 10 are received in the housing part 1 for sliding motion in a direction parallel to the housing axis 12. The upper end of the stack actuator 8 is countersupported by an adjusting screw 11 which sets the longitudinal position of the stack actuator 8 within the housing part 1. Further, in the first chamber 4, between the downwardly oriented end face of the intermediate part 10 and the spring diaphragm 3 a pressure pin 13 is provided to engage a central area on one side of the spring diaphragm 3. A central area on the opposite side of the spring diaphragm 3 is connected with the upper end of the valve needle 14 while its opposite, lower end carries a valve head 15 to open or close the nozzle opening (metering aperture) 16.

The lower housing part 2 which, by means of an external thread 17 and a sealing ring 18 may be screwed tightly into the wall of a combustion chamber of an internal combustion engine has, at the level of the second chamber 5, an annular groove 19 whose bottom is provided with a plurality of circumferentially spaced inlet ports 19*a* which open into the chamber 5 for charging the chamber 5 with pressurized fuel from a fuel line (not shown) coupled to the valve housing 2.

In the second chamber 5 there is further provided, at a distance from the spring diaphragm 3, a guide member 20 which is affixed to the inside of the housing part 2 and which has a central opening through which the upper, enlarged cylindrical part of the valve needle 14 slidably passes. The guide member 20 has at least one throughgoing port 21 to allow flow of fuel to the spring diaphragm 3 whereby the face of the latter oriented towards the second chamber 5 is exposed to fuel pressure.

Upon applying an electric voltage to the piezoelectric stack actuator 8, the latter expands in a direction parallel to the axis 12 while it is countersupported by the adjusting screw 11 so that, as a result, the valve needle 14 moves downwardly and the valve head 15 lifts off the nozzle opening 16. The downward movement of the valve needle 14 is accompanied by a downward deflection of the spring diaphragm 3. As soon as the electric voltage is removed or its polarity reversed, the piezoelectric staple actuator 8 assumes its original dimension whereupon the spring force of the spring diaphragm 3, in conjunction with the fuel pressure to which it is exposed, causes an upwardly oriented motion of the intermediate member 10 (in case it is not attached to the staple actuator 8), the pressure pin 13 as well as the valve needle 14 so that, as a result, the valve needle 14 assumes its position in which the valve head 15 closes the nozzle opening 16.

The invention thus provides a metering valve in which the actuating member is, practically without additional structural complexities, hermetically sealed from the medium to be metered. A particular advantage of the invention resides in that the design and the mode of operation of the metering valve does not require compromises which would tend to adversely affect operation, efficiency or other properties of the metering valve. It is thus feasible, as shown in FIG. 1, to arrange the electric terminals 9 in a relatively cool zone of the metering valve so that electric insulations need not be highly heat-resistant.

It will be understood that the above description of the present invention is susceptible to various modifications, changes and adaptations, and the same are intended to be comprehended within the meaning and range of equivalents of the appended claims.

What is claimed is:

1. A fluid metering valve, comprising:

(a) a housing defining an inner space; said housing having a longitudinal axis;

(b) means defining a nozzle opening in said housing;

(c) a spring diaphragm supported in said housing and hermetically dividing said inner space into a first chamber and a second chamber; said nozzle opening being arranged to communicate with said second chamber; said spring diaphragm having a central region;

(d) means defining an inlet in said housing for introducing pressurized fluid solely into said second chamber;

(e) a valve needle slidably accommodated in said second chamber and having a closed position in which the valve needle maintains said nozzle opening closed and an open position in which the valve needle maintains said nozzle opening open; said valve needle having an end; said valve needle being operatively connected to said spring diaphragm by said end thereof and being resiliently urged by said spring diaphragm into the closed position; and (f) a valve actuating member disposed in said first chamber and having an energized state and a de-energized state; said valve actuating member having an end facing and being in alignment with said end of said valve needle, said central region being situated between the facing ends of the valve actuating member and the valve needle and said end of said valve needle being attached to said central region, whereby said valve actuating member is operatively connected to said valve needle for moving the valve needle into said open position against a force of said spring diaphragm upon placement of said valve actuating member into said energized state.

2. A fluid metering valve as defined in claim 1, wherein said housing includes two axially adjoining housing parts; said spring diaphragm being clamped between the housing parts.

3. A fluid metering valve as defined in claim 1, further comprising a guide member situated in said second chamber and being secured to said housing; said guide member being situated at an axial distance from said spring diaphragm and having means for slidably guiding said valve needle.

4. A fluid metering valve as defined in claim 3, further wherein said guide member has a throughgoing port for admitting pressurized fluid to said spring diaphragm.

5. A fluid metering valve as defined in claim 1, wherein said means defining an inlet comprises an outer circumferential groove in said housing and an aperture provided in a bottom of the groove and merging into said second chamber.

6. A fluid metering valve as defined in claim 1, wherein said valve actuating member comprises a piezoelectric stack actuator.

* * * * *